(12) United States Patent
Tarbet et al.

(10) Patent No.: US 8,486,253 B2
(45) Date of Patent: Jul. 16, 2013

(54) PROCESS FOR ELECTROCOAGULATION FLUID TREATMENT

(71) Applicant: Water Rescue Services Holdings LLC, Fort Worth, TX (US)

(72) Inventors: Bryon Tarbet, Highland, UT (US); Wes W. Williams, Rhome, TX (US)

(73) Assignee: Water Rescue Services Holdings LLC, Fort Worth, TX (US)

( * ) Notice: Subject to any disclaimer, the term of this patent is extended or adjusted under 35 U.S.C. 154(b) by 27 days.

(21) Appl. No.: 13/741,921

(22) Filed: Jan. 15, 2013

(65) Prior Publication Data

US 2013/0126362 A1    May 23, 2013

Related U.S. Application Data

(62) Division of application No. 13/588,797, filed on Aug. 17, 2012, now Pat. No. 8,398,829.

(60) Provisional application No. 61/540,912, filed on Sep. 29, 2011.

(51) Int. Cl.
*C02F 1/463* (2006.01)

(52) U.S. Cl.
USPC .......................................... 205/742; 205/761

(58) Field of Classification Search
USPC .................................................. 205/742, 761
See application file for complete search history.

(56) References Cited

U.S. PATENT DOCUMENTS

| | | | |
|---|---|---|---|
| 6,238,546 B1 | 5/2001 | Knieper et al. | |
| 6,471,873 B1 | 10/2002 | Greenberg et al. | |
| 6,689,271 B2 | 2/2004 | Morkovsky et al. | |
| 6,866,757 B2 | 3/2005 | Gilmore | |
| 7,914,662 B2 | 3/2011 | Robinson | |
| 2004/0140218 A1* | 7/2004 | Gavrel et al. | 204/660 |
| 2010/0038310 A1 | 2/2010 | Shafer et al. | |
| 2011/0180263 A1 | 7/2011 | Mothersbaugh et al. | |

OTHER PUBLICATIONS

International Search Report and Written Opinion of the International Searching Authority issued in Application No. PCT/US2012/051378, dated Oct. 19, 2012.

* cited by examiner

*Primary Examiner* — Arun S Phasge
(74) *Attorney, Agent, or Firm* — Haynes and Boone, LLP

(57) ABSTRACT

A process for electrocoagulation fluid treatment utilizing a tubular member with a plurality of electrocoagulation assemblies disposed therein. The assemblies have first and second conductive plates that are angularly oriented in relation to one another to promote turbulent flow through the tubular member. A non-conductive block is positioned between the plates to stabilize and orient the plates within the tubular member. The conductive plates may be provided with alternating negative and positive charges to combat corrosion.

20 Claims, 3 Drawing Sheets

PROCESS FOR ELECTROCOAGULATION FLUID TREATMENT

PRIORITY

This application is a divisional of and claims priority to U.S. Non-provisional application Ser. No. 13/588,797 entitled, "SYSTEM AND PROCESS FOR ELECTROCOAGULATION FLUID TREATMENT," filed Aug. 17, 2012, which is a non-provisional of U.S. Provisional Application No. 61/540,912 entitled, "ELECTROCOAGULATION WATER TREATMENT SYSTEM AND METHOD FOR WELLBORE FRACTURING OPERATIONS," filed Sep. 29, 2011, all naming Bryon Tarbet and Wes Williams as inventors, the disclosures of each being hereby incorporated by reference in their entirety.

FIELD OF THE INVENTION

The present invention relates generally to fluid filtration systems and, more particularly, to a system and process for electrocoagulation fluid treatment.

BACKGROUND

Coagulation is a physiochemical operation used in water treatment. The process causes the destabilization and aggregation of smaller particles into larger particles. Generally, water contaminants such as ions (heavy metal) and colloids (organics and inorganics) are suspended in solution by electrical charges. Colloidal contaminants can be destabilized by the addition of ions having a charge opposite to that of the colloidal contaminant The destabilized colloids can be aggregated and subsequently removed by sedimentation and/or filtration.

Coagulation can be achieved by chemical or electrical means. Electrocoagulation is an electro-chemical process that simultaneously removes heavy metals, suspended solids, emulsified organics and many other contaminants from water by passing electric current through the water. The process uses DC current, consumable anodes and cathodes to combine with contaminants in a waste stream, thus producing insoluble oxides and hydroxides, called floc, that are easily separated from the clear water. A variety of anode and cathode geometries, including plates, balls, fluidized bed spheres, wire mesh, rods and tubes have been utilized for the process.

In a common prior art system, contaminated water passes in a layer between metal plates charged with a direct electrical current. The plate material is discharged, as molecules, into the stream, where ionic and non-ionic contaminants are subjected to the electrical charge, electrolysis products, and the plate elements. The process produces a number of effects depending on the species present, but generally contaminants are reacted to their most stable state as floc, and then are removed from the wastewater by physical means—typical solids separation methods like clarification, settling tanks or weir plates may be employed.

It is known in the art that EC suffers from several shortcomings that limit the utility of the method. In a typical EC system, the spacing between the plates is commonly small (less than 1 inch) with many plates inside a unit. This limits the volumetric flow rate and requires very large units or a large number of smaller units. The buildup of corrosion byproducts will often create a bridge or "short" in the system and therefore these systems require constant maintenance and cleaning. Lastly, the pathway through the EC unit does not always provide adequate contact with the water being treated because of lack of mixing.

Accordingly, in view of the foregoing shortcomings, there is a need in the art for a system and process that overcomes the current limitations by providing excellent contact with the charged plates, thorough mixing, and no cleaning requirement, as well as possessing the ability to be taken out of service for extended periods and put back into service without protracted time limitations.

DESCRIPTION OF ILLUSTRATIVE EMBODIMENTS

Illustrative embodiments and related methodologies of the present invention are described below as they might be employed in a system for electrocoagulation fluid treatment. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1A:
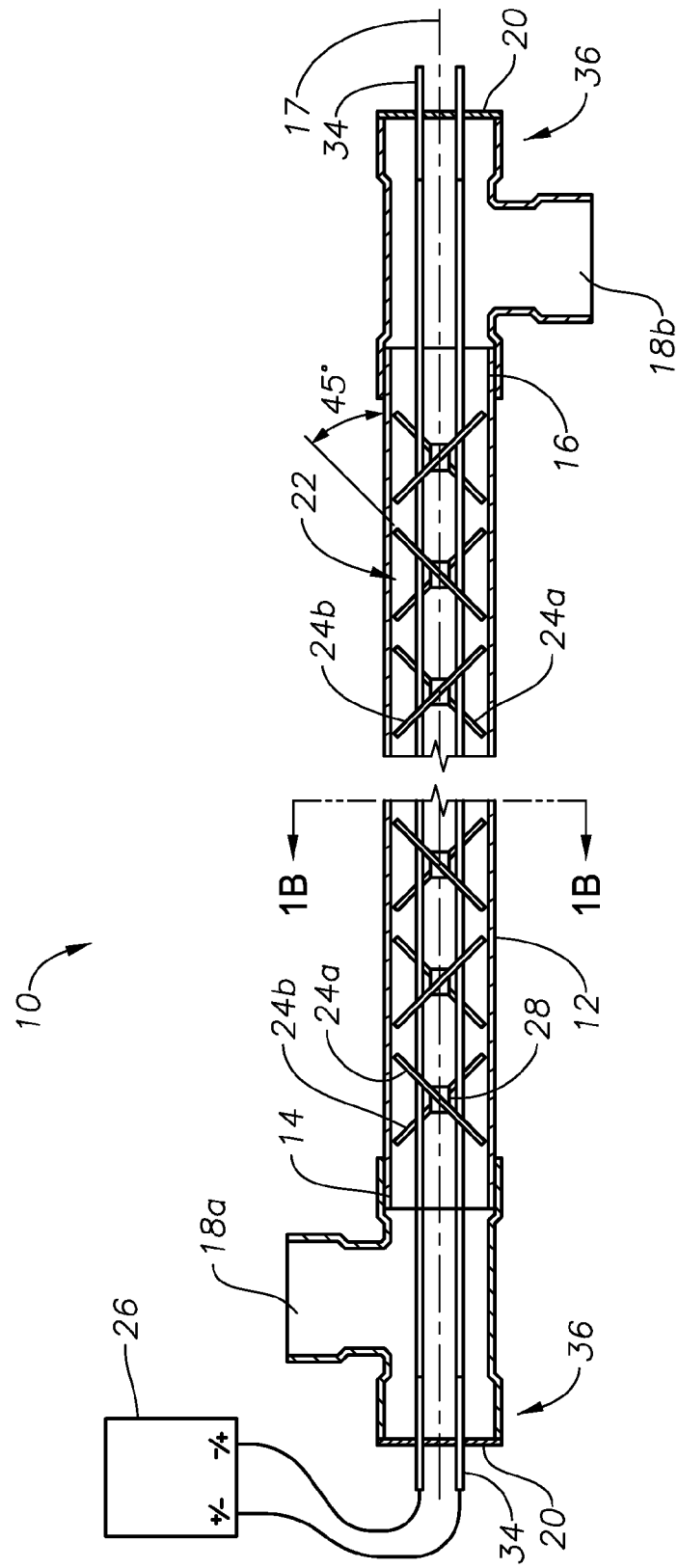
FIG. 1A is a cross-section assembly view of the electrocoagulation water clarification system according to an exemplary embodiment of the present invention.
Figure 1B:
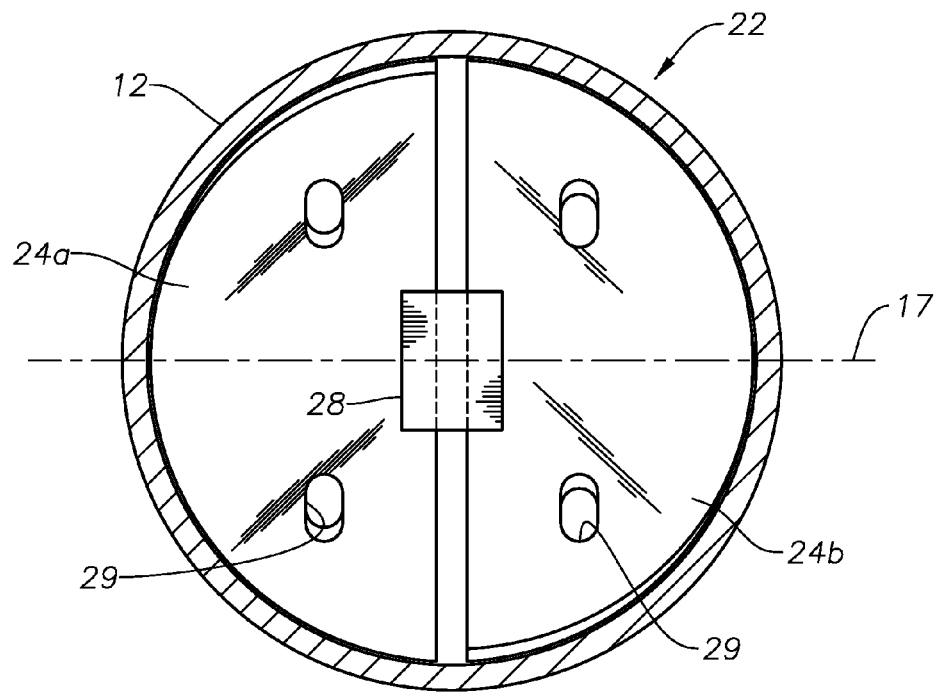
FIG. 1B is a cross-sectional view along line 1B of FIG. 1A.

With reference to FIGS. 1A & 1B, an electrocoagulation water clarification system 10 is illustrated according to an exemplary embodiment of the present invention. Water clarification system 10 includes an elongated tubular member 12 having a wall extending between a first end 14 and a second end 16 and defined along an axis 17. A fluid port 18 is located adjacent each end 14, 16. Each end 14, 16 is enclosed with an endplate 20 to form an enclosed chamber for electrocoagulation.

Disposed within tubular member 12 are one or more electrocoagulation assemblies 22. Each assembly 22 comprises a first electrically conductive plate 24a, a second electrically conductive plate 24b and a non-conductive block 28. System 10 also includes a power source 26, which may be a DC or AC current source. Those of ordinary skill in the art having the benefit of this disclosure will appreciate that tubular member 12 functions as the reaction chamber in which the electrocoagulation process of the present invention is carried out.

Figure 2:
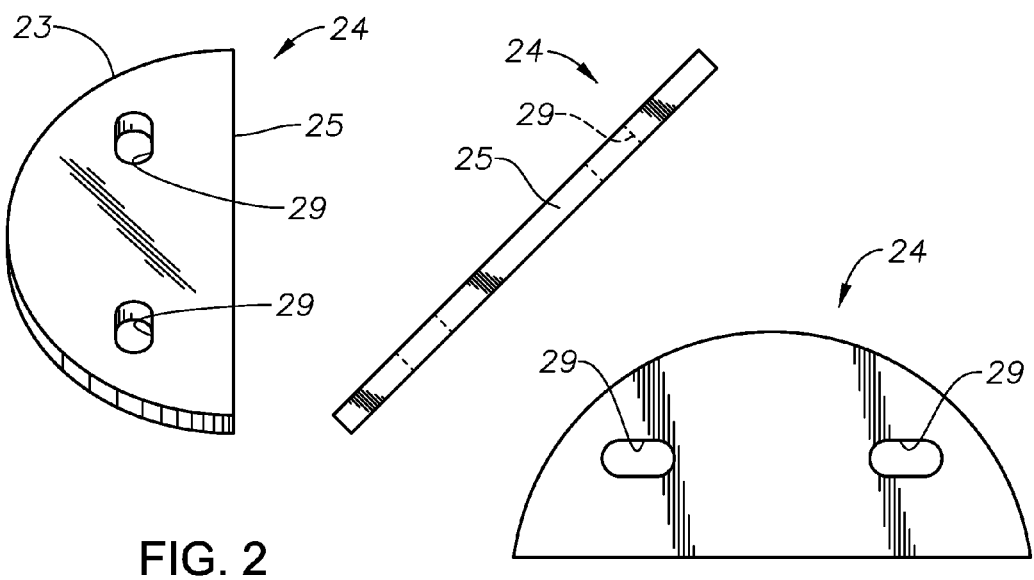
FIG. 2 illustrates perspective views of anode/cathode plates according to an exemplary invention of the present invention.

With reference to FIG. 2, plates 24 are preferably semi-circular or semi-elliptical in shape to correspond to the shape of elongated tubular member 12. As such, plates 24 have an arcuate edge 23 and a flat edge 25. However, those of ordinary skill in the art will appreciate that in other embodiments, tubular member 12, as well as plates 24, may be of other shapes without departing from the invention. For example, tubular member 12 may be square in shape, and plate 24 may be rectangular in shape. In any event, plates 24 may further include one or more apertures 29 therethrough for securing plates 24 within tubular member 12. Again, those of ordinary skill in the art will having the benefit of this disclosure appreciate that other configurations for securing plates 24 may be used without departing from the invention. In this exemplary embodiment, plates 24 are formed of conductive material such as conductive metals, which may include, but is not limited to iron, steel, or aluminum.

Those of ordinary skill in the art will appreciate that plates 24a, 24b of an electrocoagulation assembly 22 function as the anode and cathode in the electrocoagulation process. One metal plate functions as the consumable or sacrificial structure, i.e., the anode, which will be the sacrificial electrode because it will corrode to become cations that will bind together the contaminants (i.e., the coagulation process). The other metal plate will function as the cathode. In another exemplary embodiment, the function of the plates 24a, 24b as either an anode or cathode may alternate.

Figure 3A:
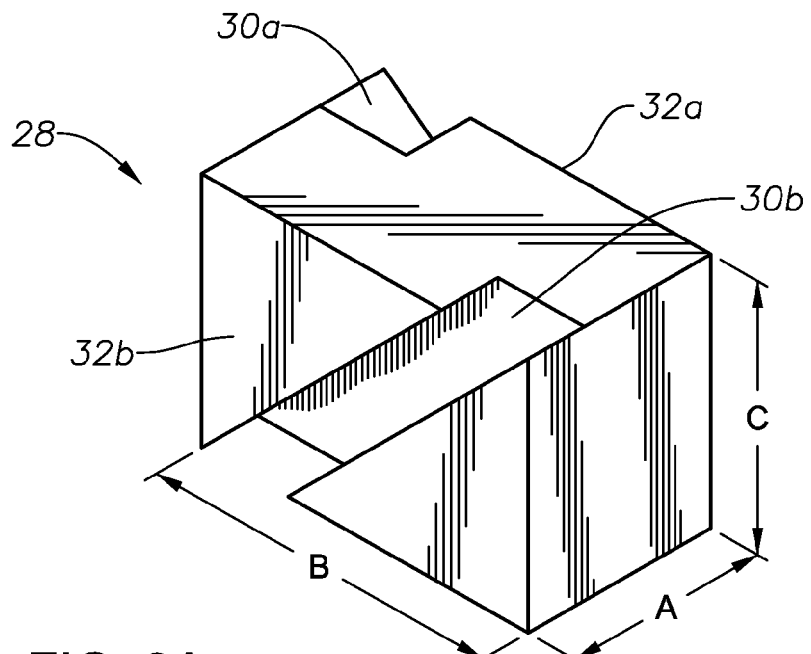
FIGS. 3A & 3B are perspective views of the block utilized to orient the plates of FIG. 2, according to an exemplary embodiment of the present invention.
Figure 3B:
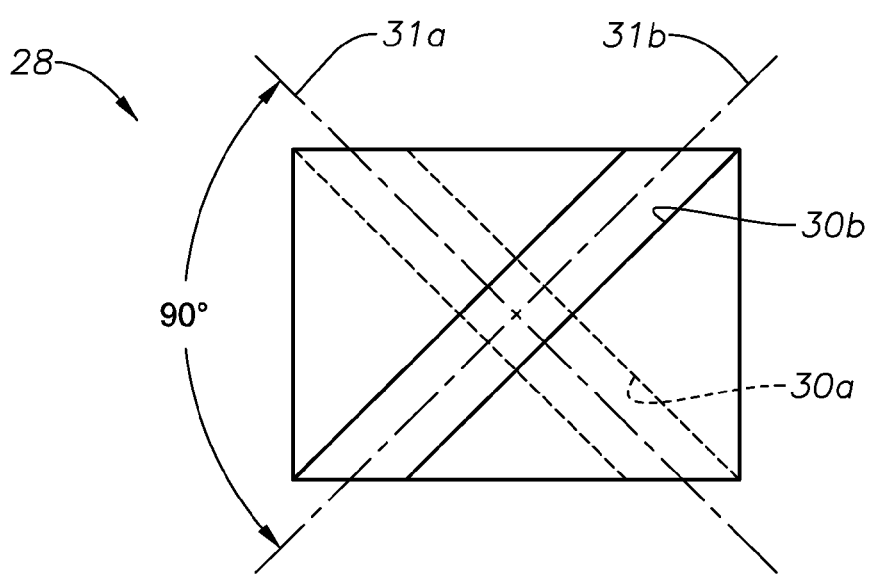

With reference to FIGS. 3A & 3B, a non-conductive block 28 is illustrated according to an exemplary embodiment of the present invention. Block 28 includes a first slot 30a and a second slot 30b. In one embodiment, block 28 is characterized by a thickness so as to have a first face 32a and a second face 32b. First slot 30a is formed along an axis 31a in one face of block 28 and second slot 30b is formed along an axis 31b in the other face of block 28. In certain embodiments, slots 30a and 30b are oriented in their respective faces so that the axii of the slots form an angle between 1 and 179 degrees. In one exemplary embodiment, the slots 30a, 30b of a block 28 are angled at 90 degrees relative to one another, as shown in FIG. 3B.

Furthermore, in certain exemplary embodiments of the invention, a length B of block 28 may be 1.341 inches, width A may be 0.75 inches, and a height C may be 0.987 inches. The preferred embodiment uses 6" CPVC industrial pipe. The elements inside are elliptical and come in 2 halves. Each half is designed to be 7.579"×2.617" and then fit into the insulation block to form an "X" as illustrated in FIGS. 1A and 1B. However, those ordinarily skilled in the art having the benefit of this disclosure realize that other dimensions may be utilized as desired.

With further reference to FIGS. 1A, 1B, & 2, and ongoing reference to FIGS. 3A & 3B, each plate 24 is mounted in a slot 30 formed in non-conductive block 28 so that plates 24a and 24b are spaced apart from one another (as shown in FIG. 1B), thereby preventing electrical contact between plates 24a and 24b of a block 28. Specifically, edge 25 of each plate 24 seats in a slot 30. While block 28 is illustrated as rectangular, those of ordinary skill in the art having the benefit of this disclosure will appreciate that block 28 may take any shape so long as block 28 secures plates 24a and 24b in a spaced apart arrangement from one another. In those exemplary embodiments where slots 30a, 30b are angled at 90 degrees relative to one another, plates 24a and 24b, when mounted in slots 30a, 30b, are angled at 90 degrees to one another. As previously described, block 28 is formed of non-conducting material. Such non-conducting material may include, for example, polyvinyl chloride, chlorinated polyvinyl chloride, polytetrafluoroethylene, or elastomers.

With reference back to FIGS. 1A & 1B, electrocoagulation assemblies 22 are oriented in elongated tubular member 12 so that plates 24 are angled relative to axis 17 of tubular member 12. In the exemplary embodiment where plates 24a, 24b are angled at 90 degrees relative to one another, plates 24a, 24b are preferably angled at 45 degrees relative to axis 17.

According to an exemplary embodiment of the present invention, electrocoagulation assemblies 22 are secured within tubular member 12 by elongated rods 34. More specifically, assemblies are alternatingly arranged so that plates 24a of every other assembly 22 are parallel to one another. Likewise, plates 24b of every other assembly 22 are parallel to one another. In such an orientation, a first aperture 29 in each of the parallel plates 24a is aligned along an axis passing through the apertures 29. Similarly, a first aperture 29 in each of the parallel plates 24b is aligned along an axis passing through the apertures. An elongated rod 34 may be passed through each set of aligned apertures to secure the alternating assemblies 22 in tubular member 12. Moreover, rods 34 may be threaded on the ends to permit rods 34 to be secured to end plates 20.

In an alternate exemplary embodiment, block 28 may be eliminated and rods 34 may instead be utilized to orient and secure the plates. In another exemplary embodiment, rods 34 are conductive such that as a rod 34 passes through the aperture 28 of a plate 24, electrical contact between the plate 24 and rod 34 is established. In such an embodiment, as will be described below, rod 34 can be utilized to form a conductive path from power source 26 to plates 24.

Further referring to FIG. 1A, in some preferred embodiments, end plates 20 are non-conductive and rods 34 are secured to end plates 20 with internally threaded fasteners (not shown) disposed to engage the threaded ends of rods 34. In other embodiments, rods 34 may be secured against end plates 20 by other non-conductive support structures. Those of ordinary skill in the art having the benefit of this disclosure will appreciate that rather than threaded ends and threaded fasteners, other types of fasteners may be utilized to secure rods 34. Furthermore, in the alternative, non-conductive bushings, washers, sleeves or similar insulating structure may be utilized to support rods 34 carried by end plates 20 in which case, end plats 20 may be metal.

In other exemplary embodiments, rods 34 may be used to secure end plates 20 over the open ends of elongated tubular member 12. Engaging fasteners to the threaded ends of rods 34 can be used to cause plates 20 to compress against the open ends 14, 16 of tubular member 12. A sealing gasket may also be provided to ensure sealing between plate 20 and the ends 14, 16 of tubular member 12.

Further referring to FIG. 1A, a fitting 36 is provided on each end of elongated tubular member 12. In certain embodiments, as illustrated, fitting 36 is a T-fitting defining port 18. In certain embodiments, power source 26 is a direct current power source, operating at 10-200 amps, preferably 70-90 amps, and supplies a voltage of 1-15 volts DC, preferably 4-6 volts. During testing of the present invention, it was discovered that a system 10 with a tubular member 12 that is approximately 90 inches long and 6 inches in diameter and operating with these preferred voltage and current ranges can treat fluid flowing at approximately 350-400 gallons per minute, although flow rates as high as 500 gallons per minute have been achieved. As previously described, power source 26 is in electrical contact with rods 34. As such, rods 34 function as an electrical conduit to provide positive and negative charges to the plates 24 to facilitate the electrocoagulation process.

An exemplary operation of the present invention will now be described. In a hydrocarbon context, fluids are recovered from a wellbore and treated with the electrocoagulation system described herein. The recovered fluids are fracturing fluids pumped down a wellbore in order to fracture the formation to stimulate hydrocarbon flow. The recovered fracturing fluid is directed into the first port 18a and caused to pass around plates 24. The angular orientation of plates 24a and 24b relative to one another, as well as the alternating orientation of plates 24a between adjacent electrocoagulation assemblies 22, inhibit laminar flow through tubular member 12, and create turbulence along axis 17, thereby enhancing the electrochemical reactions in member 12.

Moreover, but significantly, this turbulence inhibits corrosion and build-up on plates 24 that could interfere with the efficiency of system 10. Referring to FIG. 1A, as the fluid flows across a plate 24 functioning as an anode, the plate will be subjected to oxidation, releasing free ions that will combine with the contaminants to form precipitates or floc in the fluid. The treated fluid and floc exit the reaction chamber, i.e., tubular member 12, via the second port 18b, at which point the floc can then be removed from the fluid by various means known in the art, including sedimentation or filtration. The treated fluid may then be mixed with proppant and/or other components and subsequently reinjected into the formation.

In ongoing operations, a first portion of the plates (e.g., 24a) are provided with a positive charge (the anode plates) and a second portion of the plates (e.g., 24b) are provided with a negative charge (the cathode plates). In an alternative exemplary embodiment, the charges may be alternated over a given time period to minimize corrosion and build up. Typically, a cathode will be subjected to formation of deposits on its surface, known as passivation, which can affect process optimization. Alternating the charges in this way, particularly when combined with the turbulent flow through the member 12, will minimize passivation. In one non-limiting example, the charges on the plates of any given electrocoagulation assembly 22 may be reversed every 24 hours, such that the anodes become the cathodes, and vice-versa.

An exemplary embodiment of the present invention provides an electrocoagulation fluid treatment system comprising a tubular member having a wall extending between a first end and a second end and defined along an axis, and an electrocoagulation assembly disposed along the axis of the tubular member. The electrocoagulation assembly comprises a first electrically conductive plate and a second electrically conductive plate, wherein the first and second electrically conductive plates are secured adjacent one another so as to form an angle between one another. The fluid treatment system further comprises a power source electrically coupled to the first and second electrically conductive plates.

An exemplary methodology of the present invention provides an electrocoagulation fluid treatment process comprising the steps of providing a tubular member having a wall extending between a first end and a second end and defined along an axis, and providing an electrocoagulation assembly disposed along the axis of the tubular member. The electrocoagulation assembly comprises a first electrically conductive plate and a second electrically conductive plate, wherein the first and second electrically conductive plates are secured adjacent one another so as to form an angle between one another. The method also comprises the steps of providing a positive electrical charge to the first electrically conductive plate, providing a negative charge to the second electrically conductive plate, passing the fluid across the first and second electrically conductive plates, thereby creating floc within the fluid, and removing the floc from the tubular member, thereby treating the fluid.

Yet another exemplary methodology of the present invention provides a process for treating fluid received from a downhole fracturing operation, the method comprising the steps of pumping a fracturing fluid down a wellbore, recovering the fracturing fluid from the wellbore, and directing the recovered fluid into a first port of a chamber, the chamber comprising at least one electrocoagulation assembly disposed therein. The electrocoagulation assembly comprises a first electrically conductive plate and a second electrically conductive plate, wherein the first and second electrically conductive plates are secured adjacent one another so as to form an angle between one another. The process also comprises the steps of providing a positive electrical charge to the first electrically conductive plate, providing a negative charge to the second electrically conductive plate, passing the recovered fluid across the first and second electrically conductive plates, thereby creating floc within the recovered fluid, removing the floc from the tubular member, thereby producing a treated fluid, and reusing the treated fluid as fracturing fluid for the wellbore.

Although various embodiments and methodologies have been shown and described, the invention is not limited to such embodiments and methodologies and will be understood to include all modifications and variations as would be apparent to one skilled in the art. For example, although described herein in conjunction with the treatment of fracturing fluid, the present invention may be utilized to filter a variety of other fluids. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. An electrocoagulation fluid treatment process for treating a fluid stream,
comprising:
providing a tubular member having a wall extending between a first end and a second end and defined along an axis;
providing an electrocoagulation assembly disposed along the axis of the tubular member, the electrocoagulation assembly comprising:
a first electrically conductive plate; and
a second electrically conductive plate, wherein the first and second electrically conductive plates are secured adjacent one another so as to form an angle between one another of between about 45 and 90 degrees;
providing a positive electrical charge to the first electrically conductive plate;
providing a negative charge to the second electrically conductive plate;
passing the fluid stream across the first and second electrically conductive plates, thereby creating floc within the fluid stream; and
removing the floc from the tubular member, thereby treating the fluid stream.

2. A process as defined in claim 1, further comprising securing the first and second electrically conductive plates to one another utilizing a non-conductive block, wherein the first and second electrically conductive plates are spaced apart from one another.

3. A process as defined in claim 2, further comprising:
providing the block with a first face having a first slot defined therein; and
providing the block with a second face spaced apart from the first face and having a second slot defined therein, the first and second slots arranged on the block so as to define an angle between the first and second slots.

4. A process as defined in claim 1, further comprising recovering return fluid from a wellbore fracturing process and introducing the return fluid into the tubular member as the fluid stream.

5. A process as defined in claim 1, wherein providing the electrocoagulation assembly further comprises providing a plurality of electrocoagulation assemblies disposed along the axis of the tubular member.

6. A process as defined in claim 5, further comprising:
aligning apertures of the first electrically conductive plates of every other electrocoagulation assembly with one another; and
aligning apertures of the second electrically conductive plates of every other electrocoagulation assembly with one another.

7. A process as defined in claim 1, wherein providing the tubular member further comprises providing the tubular member as an enclosed chamber, the process further comprising:
providing a first fluid port adjacent the first end of the tubular member and in fluid communication with the enclosed chamber and introducing the fluid stream into the chamber through the first fluid port; and
providing a second fluid port adjacent the second end of the tubular member and in fluid communication with the enclosed chamber and removing the fluid stream from the chamber through the second fluid port.

8. A process as defined in claim 1, further comprising alternating the positive and negative electrical charges between the first and second electrically conducting plates.

9. A process as defined in claim 1, wherein passing the fluid stream across the first and second electrically conductive plates comprises passing fluid from a downhole fracturing process over the first and second electrically conductive plates.

10. A process for treating a fluid recovered from a downhole fracturing operation, the method comprising:
pumping a fracturing fluid down a wellbore;
recovering fracturing return fluid from the wellbore;
directing the recovered return fluid into a first port of a chamber, the chamber comprising at least one electrocoagulation assembly disposed therein, the electrocoagulation assembly comprising:
a first electrically conductive plate;
a second electrically conductive plate, wherein the first and second electrically conductive plates are secured adjacent one another so as to form an angle between one another;
a non-conductive support having:
a first face with a first slot defined therein; and
a second face spaced apart from the first face and having a second slot defined therein, the first and second slots arranged on the support so as to define an angle between the first and second slots of between 1 and 179°;
providing a positive electrical charge to the first electrically conductive plate;
providing a negative charge to the second electrically conductive plate;
passing the recovered return fluid across the first and second electrically conductive plates to create floc;
removing the floc from the tubular member, thereby producing a treated fluid stream; and
reusing the treated fluid stream as part of the fracturing fluid for a wellbore.

11. A process as defined in claim 10, further comprising alternating the positive and negative electrical charges between the first and second electrically conducting plates.

12. An electrocoagulation fluid treatment process, comprising:
injecting fluid into an elongated tubular chamber defined along an axis;
causing the fluid to flow substantially along the length of the tubular chamber;
creating turbulent flow of the fluid along a portion of the chamber by directing fluid to a first set of electrically conductive plates comprising:
a first electrically conductive plate spaced apart from the axis; and
a second electrically conductive plate spaced apart from the axis opposite the first electrically conductive plate, wherein the first and second electrically conductive plates are secured adjacent one another so as to form an angle between one another;
providing a positive electrical charge to one of the electrically conductive plates of the first set of electrically conductive plates;
providing a negative charge to the other electrically conductive plate of the first set of electrically conductive plates; and
removing the floc from the tubular member, thereby treating the fluid.

13. A process as defined in claim 12, further comprising:
directing fluid to a second set of electrically conductive plates comprising:
a first electrically conductive plate spaced apart from the axis; and
a second electrically conductive plate spaced apart from the axis opposite the first electrically conductive plate, wherein the first and second electrically conductive plates are secured adjacent one another so as to form an angle between one another;
providing a positive electrical charge to one of the electrically conductive plates of the second set of electrically conductive plates; and
providing a negative electrical charge to the other electrically conductive plate of the second set of electrically conductive plates.

14. A process as defined in claim 13, wherein fluid is alternatingly directed between a plurality of the first set of plates and a plurality of the second set of plates disposed along the chamber.

15. A process as defined in claim 12, further comprising alternating the positive and negative electrical charges on the set of plates over a time period.

16. A process as defined in claim 12, further comprising securing the first and second electrically conductive plates on opposite sides of the axis using a non-conductive support.

17. A process as defined in claim 16, further comprising:
providing the support with a first face comprising a first slot defined therein; and
providing the support with a second face spaced apart from the first face, the second face comprising a second slot defined therein, wherein the first and second slots are arranged on the support so as to define an angle between the first and second slots of between 1 and 179 degrees.

18. A process as defined in claim 17, further comprising providing the first and second electrically conductive plates with an aperture therethrough, wherein a plurality of sets of plates are disposed along the axis of the tubular chamber so that the apertures of a first portion of the first and second electrically conductive plates are aligned and the apertures of a second portion of the first and second electrically conductive plates are aligned.

19. A process as defined in claim 18, further comprising:
extending a first electrically conductive rod through the aligned apertures of the first portion of the first and second electrically conductive plates, wherein the first electrically conductive plate is in electrical contact with the first portion of the first and second electrically conductive plates; and
extending a second electrically conductive rod through the aligned apertures of the second portion of the first and second electrically conductive plates, wherein the second electrically conductive plate is in electrical contact with the second portion of the first and second electrical conductive plates.

20. A process as defined in claim 12, wherein injecting fluid into the elongated tubular chamber further comprises injecting fluid received from a downhole fracturing process.

* * * * *